(12) United States Patent
Garman et al.

(10) Patent No.: US 11,571,083 B2
(45) Date of Patent: Feb. 7, 2023

(54) APPLIANCE AND METHOD FOR COOKING EGGS AND OTHER FOODSTUFFS

(71) Applicant: Hamilton Beach Brands, Inc., Glen Allen, VA (US)

(72) Inventors: Michael Garman, Stafford, VA (US); Derek A McCullough, Richmond, VA (US); Elena A Marentes, Glen Allen, VA (US); Paul M Blankenship, Glen Allen, VA (US)

(73) Assignee: Hamilton Beach Brands, Inc., Glen Allen, VA (US)

( * ) Notice: Subject to any disclaimer, the term of this patent is extended or adjusted under 35 U.S.C. 154(b) by 804 days.

(21) Appl. No.: 16/441,199

(22) Filed: Jun. 14, 2019

(65) Prior Publication Data

US 2020/0390266 A1    Dec. 17, 2020

(51) Int. Cl.
| | |
|---|---|
| *A47J 29/02* | (2006.01) |
| *A47J 29/06* | (2006.01) |
| *A47J 27/04* | (2006.01) |
| *A47J 27/10* | (2006.01) |
| *A23B 5/005* | (2006.01) |

(52) U.S. Cl.
CPC ............ *A47J 29/02* (2013.01); *A23B 5/0052* (2013.01); *A47J 27/04* (2013.01); *A47J 27/10* (2013.01); *A47J 29/06* (2013.01); *A47J 2203/00* (2013.01)

(58) Field of Classification Search
CPC ...... A47J 29/02; A47J 2203/00; A47J 27/002; A47J 27/04; A47J 27/10; A47J 36/00; A47J 36/2461; A47J 2027/043; A47J 29/00–29/06; A47J 27/18; A47J 27/21041; A23L 5/13; A23L 15/00; A23B 5/005–5/0055
See application file for complete search history.

(56) References Cited

U.S. PATENT DOCUMENTS

| | | | |
|---|---|---|---|
| 59,441 A | * | 11/1866 | Newburg |
| 96,518 A | * | 11/1869 | Waterman |
| 587,152 A | * | 7/1897 | Leavitt |

(Continued)

FOREIGN PATENT DOCUMENTS

| | | |
|---|---|---|
| CN | 202168739 U | 3/2012 |
| CN | 103431760 B | 12/2013 |

(Continued)

*Primary Examiner* — Drew E Becker
(74) *Attorney, Agent, or Firm* — Alexander D. Raring

(57) ABSTRACT

A cooking appliance includes: a base; a heater basin mounted above the base and comprising a floor and a side wall that form a cavity configured to hold water, the side wall having a perimeter edge; a heating element mounted beneath the floor of the heater basin and configured to be connected to a power source; an egg cup unit comprising a main panel and at least one cup depending from the main panel, the main panel having a perimeter edge, the at least one cup having a floor that contacts the floor of the heater basin; and a lid attached to the base and configured to cover the egg cup unit. The perimeter edge of the heater basin and the perimeter edge of the egg cup unit are in contact, the interaction of the perimeter edge of the egg cup unit and the perimeter edge of the heater basin configured to impede flow of steam generated by boiling water in the cavity of the heater basin.

10 Claims, 14 Drawing Sheets

(56) References Cited

U.S. PATENT DOCUMENTS

| | | | |
|---|---|---|---|
| 634,557 A * | 10/1899 | Halstead | |
| 734,054 A * | 7/1903 | Frost | |
| 1,316,006 A * | 9/1919 | Wagner | A47J 27/10 126/246 |
| 1,334,930 A * | 3/1920 | Chadwick | A47J 27/10 220/912 |
| 1,545,393 A * | 7/1925 | Bryant | A47J 27/10 126/265 |
| 1,616,050 A * | 2/1927 | Kania | A47J 27/10 220/203.03 |
| 1,814,754 A | 7/1931 | Hettie | |
| 1,850,131 A | 3/1932 | Mennicke | |
| 1,961,756 A * | 6/1934 | French | A47J 27/10 99/428 |
| 2,093,013 A | 9/1937 | Jennings | |
| 2,761,375 A * | 9/1956 | Jepson | A47J 29/00 99/344 |
| 2,807,701 A * | 9/1957 | Conlin | A47J 29/06 392/338 |
| 3,065,078 A * | 11/1962 | Minami | A47J 27/10 426/233 |
| 3,539,075 A * | 11/1970 | Bautista | A47G 19/12 220/573.4 |
| 3,577,908 A * | 5/1971 | Burg | A47J 27/004 219/442 |
| 3,704,663 A * | 12/1972 | Shull | A47J 37/10 99/347 |
| 3,720,156 A * | 3/1973 | Hentschel | A47J 29/02 D7/354 |
| 3,946,893 A * | 3/1976 | Bowersmith | A47J 27/10 220/756 |
| 4,187,412 A * | 2/1980 | Ernster | A47J 29/02 200/321 |
| 4,276,820 A | 7/1981 | Joannou | |
| 4,509,412 A | 4/1985 | Whittenburg et al. | |
| 5,012,947 A * | 5/1991 | Roland | A47J 27/10 220/573.1 |
| 5,045,672 A * | 9/1991 | Scott | H05B 3/78 219/439 |
| 5,203,257 A * | 4/1993 | Goad | A47J 27/17 126/369 |
| 6,462,312 B1 * | 10/2002 | Feagley | A47J 27/17 219/536 |
| 6,646,234 B2 | 11/2003 | Damrath | |
| 6,840,159 B1 | 1/2005 | Li | |
| 7,312,424 B2 | 12/2007 | Hannon et al. | |
| D569,679 S | 5/2008 | Lion et al. | |
| 9,271,596 B2 | 3/2016 | Seddon | |
| 10,568,334 B2 * | 2/2020 | Yzuel Sanz | A23L 15/00 |
| 2003/0033940 A1 | 2/2003 | Damrath et al. | |
| 2004/0065211 A1 * | 4/2004 | McNair | A47J 27/10 99/348 |
| 2004/0222208 A1 * | 11/2004 | Ko | F24C 15/327 219/400 |
| 2005/0072315 A1 * | 4/2005 | Romero | A47J 37/1271 99/403 |
| 2005/0244566 A1 * | 11/2005 | Poltnikov | A47J 29/02 426/614 |
| 2010/0051603 A1 * | 3/2010 | Powell | A47J 29/02 219/448.11 |
| 2018/0014560 A1 * | 1/2018 | Waltz | A23L 5/13 |
| 2018/0177324 A1 * | 6/2018 | Powell | A47J 29/02 |

FOREIGN PATENT DOCUMENTS

| | | |
|---|---|---|
| CN | 204218667 U | 3/2015 |
| CN | 207707772 U | 8/2018 |
| CN | 109770714 A | 5/2019 |
| EP | 0860131 A1 | 8/1998 |

* cited by examiner

APPLIANCE AND METHOD FOR COOKING EGGS AND OTHER FOODSTUFFS

FIELD OF THE INVENTION

The present invention relates generally to kitchen appliances, and more particularly to small appliances.

BACKGROUND

Eggs are a ubiquitous foodstuff, particularly for breakfast. Traditionally they are served in a variety of ways (e.g., scrambled, fried, boiled, etc.); recently different manners of preparing and presenting single servings of eggs have been developed, particularly in commercial settings.

It may be desirable to provide apparatus and techniques for preparing single servings of eggs, particularly in home settings.

SUMMARY

As a first aspect, embodiments of the present disclosure are directed to a cooking appliance comprising: a base; a heater basin mounted above the base and comprising a floor and a side wall that form a cavity configured to hold water, the side wall having a perimeter edge; a heating element mounted beneath the floor of the heater basin and configured to be connected to a power source; an egg cup unit comprising a main panel and at least one cup depending from the main panel, the main panel having a perimeter edge, the at least one cup having a floor that contacts the floor of the heater basin; and a lid mounted on the base and configured to cover the egg cup unit. The perimeter edge of the heater basin and the perimeter edge of the egg cup unit are in contact, the interaction of the perimeter edge of the egg cup unit and the perimeter edge of the heater basin configured to impede flow of steam and splashing water generated by boiling water in the cavity of the heater basin.

As a second aspect, embodiments of the present disclosure are directed to a cooking appliance comprising: a base; a heater basin mounted above the base and comprising a floor and a side wall that form a cavity configured to hold water, the side wall having a perimeter edge; a heating element mounted beneath the floor of the heater basin and configured to be connected to a power source; an egg cup unit comprising a main panel and at least one cup depending from the main panel, the main panel having a perimeter edge, the at least one cup having a floor that contacts the floor of the heater basin; and a lid mounted on the base and configured to cover the egg cup unit. The perimeter edge of the egg cup unit rests on but is not fixed to the perimeter edge of the heater basin, the interaction of the perimeter edge of the egg cup unit and the perimeter edge of the heater basin configured to impede flow of steam and splashing water generated by boiling water in the cavity of the heater basin.

As a third aspect, embodiments of the present disclosure are directed to a method of cooking an egg comprising:
 (a) providing a cooking appliance comprising:
  a base;
  a heater basin mounted above the base and comprising a floor and a side wall that form a cavity configured to hold water, the side wall having a perimeter edge;
  a heating element mounted beneath the floor of the heater basin and configured to be connected to a power source;
  an egg cup unit comprising a main panel and at least one cup depending from the main panel, the main panel having a perimeter edge, the at least one cup having a floor that contacts the floor of the heater basin;
 (b) introducing water into the heater basin;
 (c) depositing uncooked egg into the at least one cup; and
 (d) energizing the heating element to cook the egg;
 wherein the perimeter edge of the heater basin and the perimeter edge of the egg cup unit are in contact, and wherein heat from the heating element causes the water in the heating basin to boil, the interaction of the perimeter edge of the egg cup unit and the perimeter edge of the heater basin configured to impede flow of steam and splashing water generated by the boiling water in the cavity of the heater basin.

DETAILED DESCRIPTION

Figure 1:
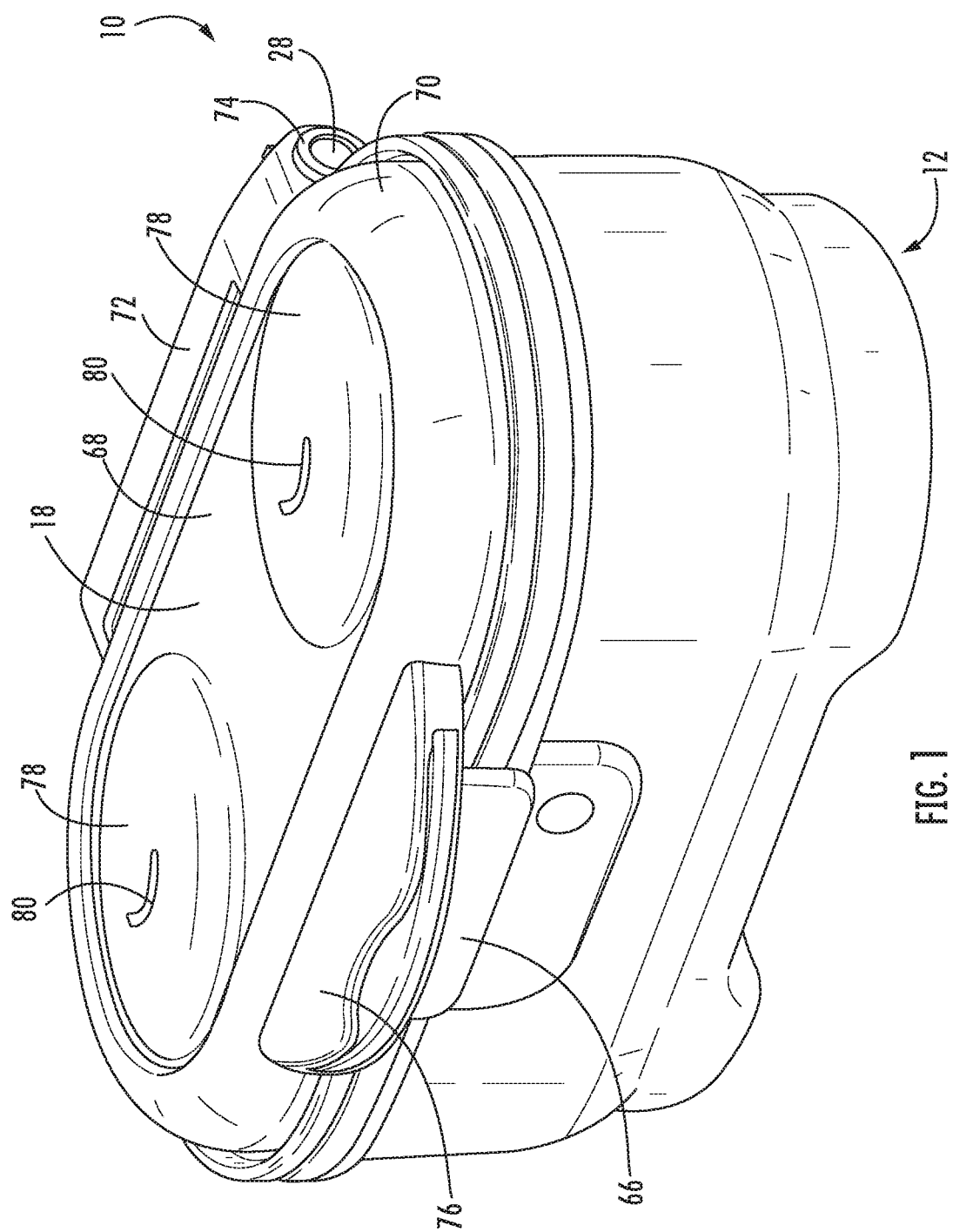
FIG. 1 is a perspective view of a cooking appliance according to embodiments of the invention.

The present disclosure now is described more fully hereinafter with reference to the accompanying drawings, in which various embodiments of the disclosure are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

In the figures, certain layers, components or features may be exaggerated for clarity, and broken lines illustrate optional features or operations unless specified otherwise. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention. The sequence of operations (or steps) is not limited to the order presented in the claims or figures unless specifically indicated otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Referring now to the drawings, an egg cooking appliance, designated broadly at 10, is shown therein. The appliance 10 includes a base 12, a heater basin 14, an egg cup unit 16, and a lid 18. These components are described in detail below.

Figure 2:
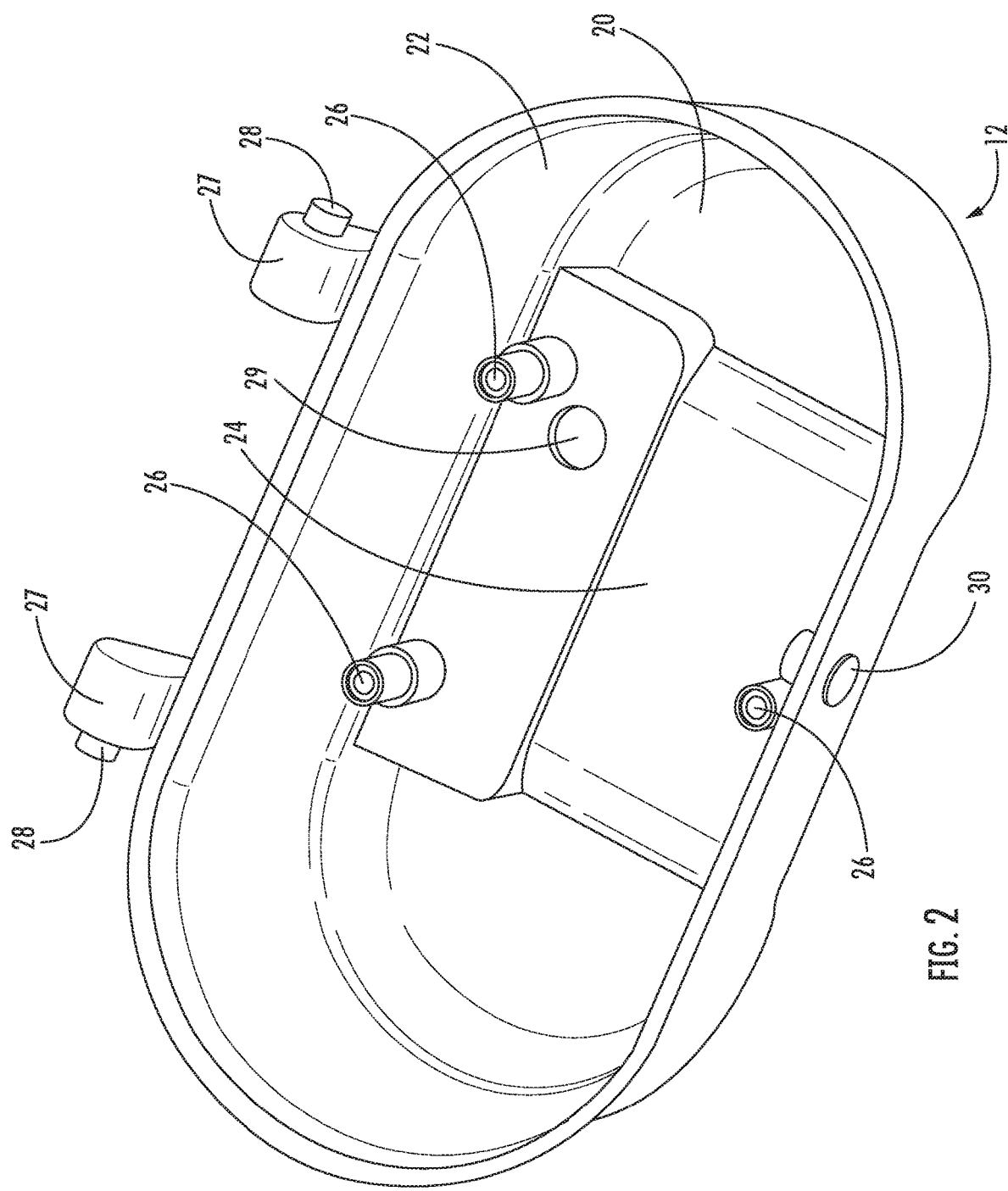
FIG. 2 is a perspective view of the base of the cooking appliance of FIG. 1.

Referring first to FIG. 2, the base 12 is generally an oblong open vessel, with a floor 20 and a continuous side wall 22. The floor 20 includes a raised central portion 24. Three bosses 26 rise from the central portion 24. Two lugs 27 are mounted on the top edge of one side of the side wall 22; a hinge post 28 extends longitudinally from each of the lugs 27. One or more indicator lights 30, 31 (e.g., power and heating) are mounted to the side wall 22 opposite the lugs 27. A hole 29 for routing appliance wiring (discussed below) from the base 12 is adjacent one of the bosses 26.

Figure 3:
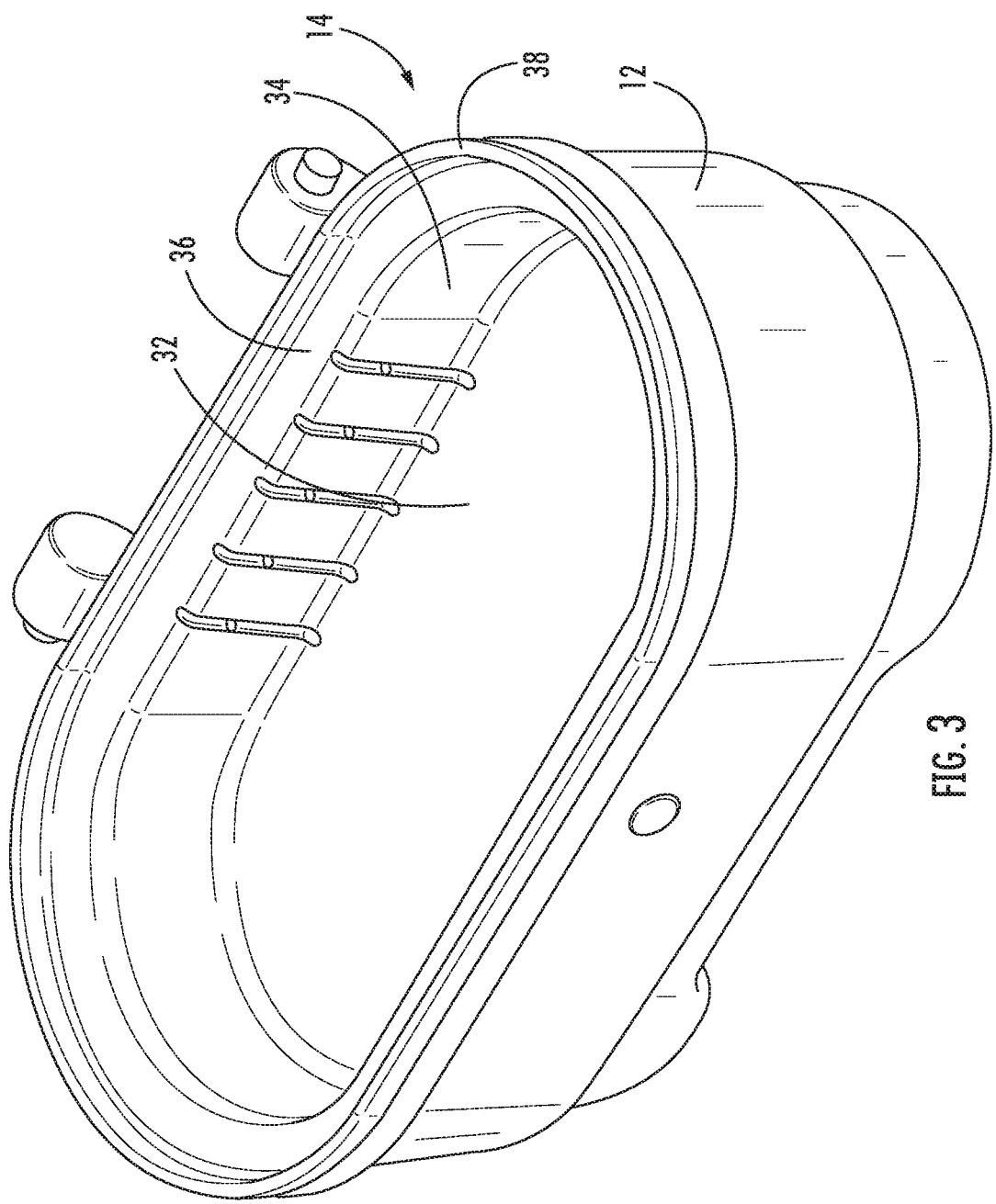
FIG. 3 is a perspective view of the base and heater basin of the cooking appliance of FIG. 1.
Figure 6:
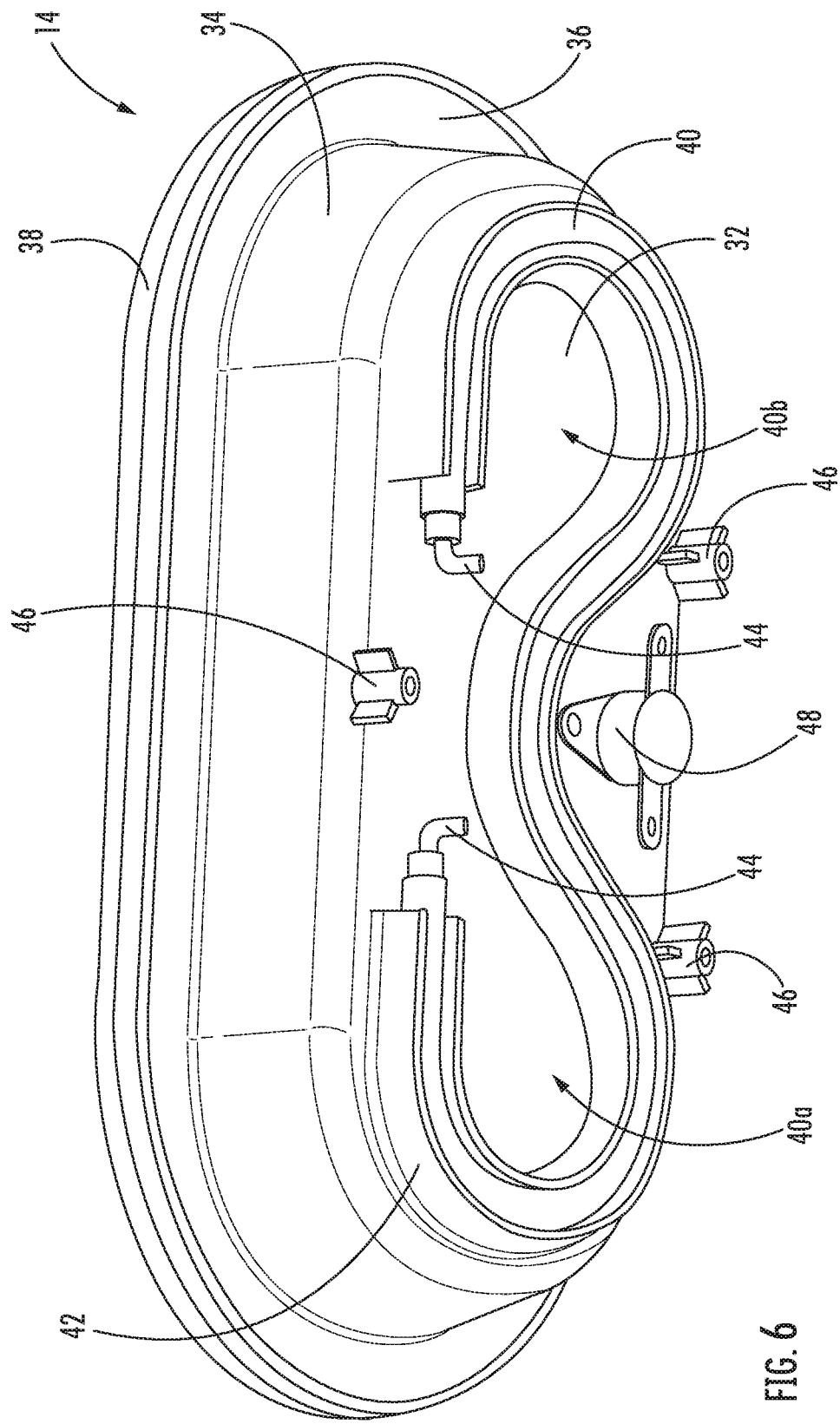
FIG. 6 is a bottom perspective view of the heater basin of the cooking appliance of FIG. 1.

Referring now to FIGS. 3 and 6, the heater basin 14 also defines a generally oblong vessel. The heater basin 14 has a floor 32, a continuous side wall 34, and a radially-extending lip 36 that extends from the upper edge of the side wall 34. A rim 38 extends upwardly from the outer edge of the lip 36. On its lower surface, the floor 32 of the heater basin 14 includes a serpentine heating element 40 that is mounted within a similarly-routed channel 42. As can be seen in FIG. 6, the heating element 40 has two open loops 40a, 40b. An electrode 44 is present at each end of the heating element 40. Also, three locator posts 46 extend downwardly from the floor 32 in positions that align with the bosses 26 of the base 12. Also, a thermostat 84 extends downwardly from the floor 32 between the locator posts 46.

As can be seen in FIG. 3, the heater basin 14 is fixed to and fits within the base 12. The bosses 26 receive the locator posts 46 to align the heater basin 14 relative to the base 12. The appliance wire is electrically connected with the electrodes 44 of the heating element 40 and routed out through the hole 29 in the base 12. The power cord 82 (not shown in FIG. 3) connects to the opposing end of the appliance wire on the lower side hole 29, in the wiring compartment (not shown in FIG. 3) of the base 12.

Figure 4:
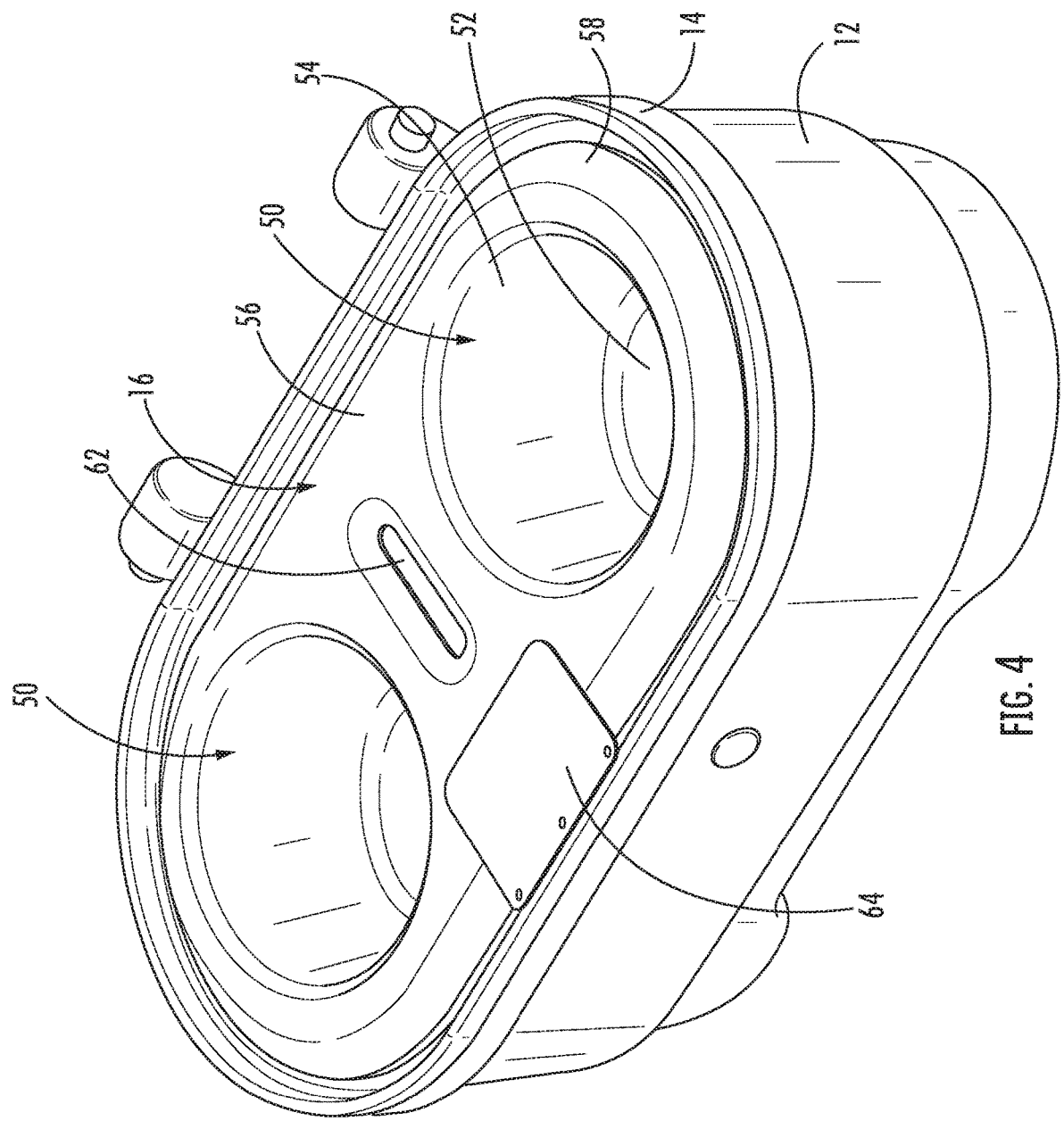
FIG. 4 is a perspective view of the base, heater basin and egg cup unit of the cooking appliance of FIG. 1.
Figure 5:
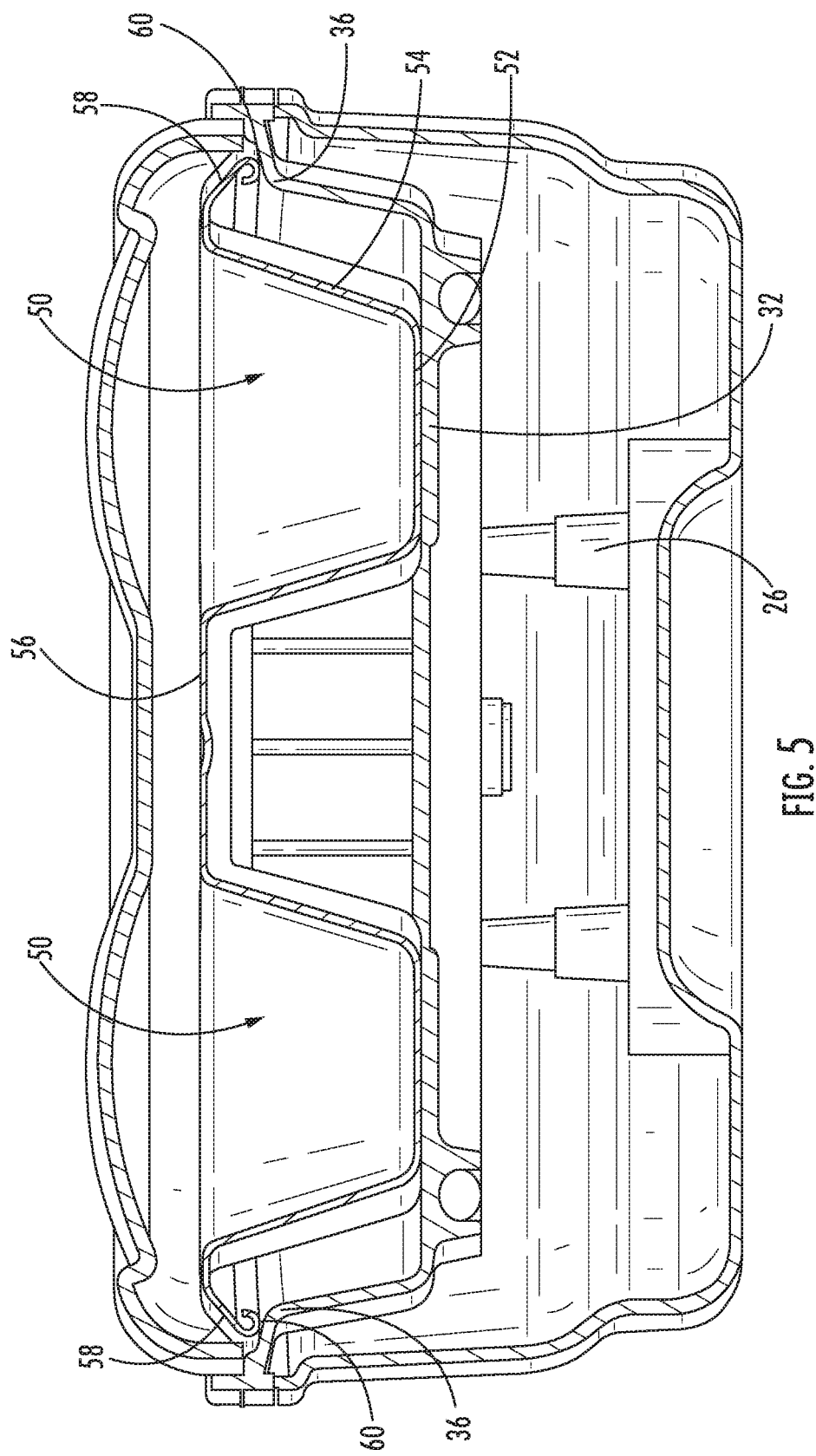
FIG. 5 is a section view of the cooking appliance of FIG. 1.
Figure 7:
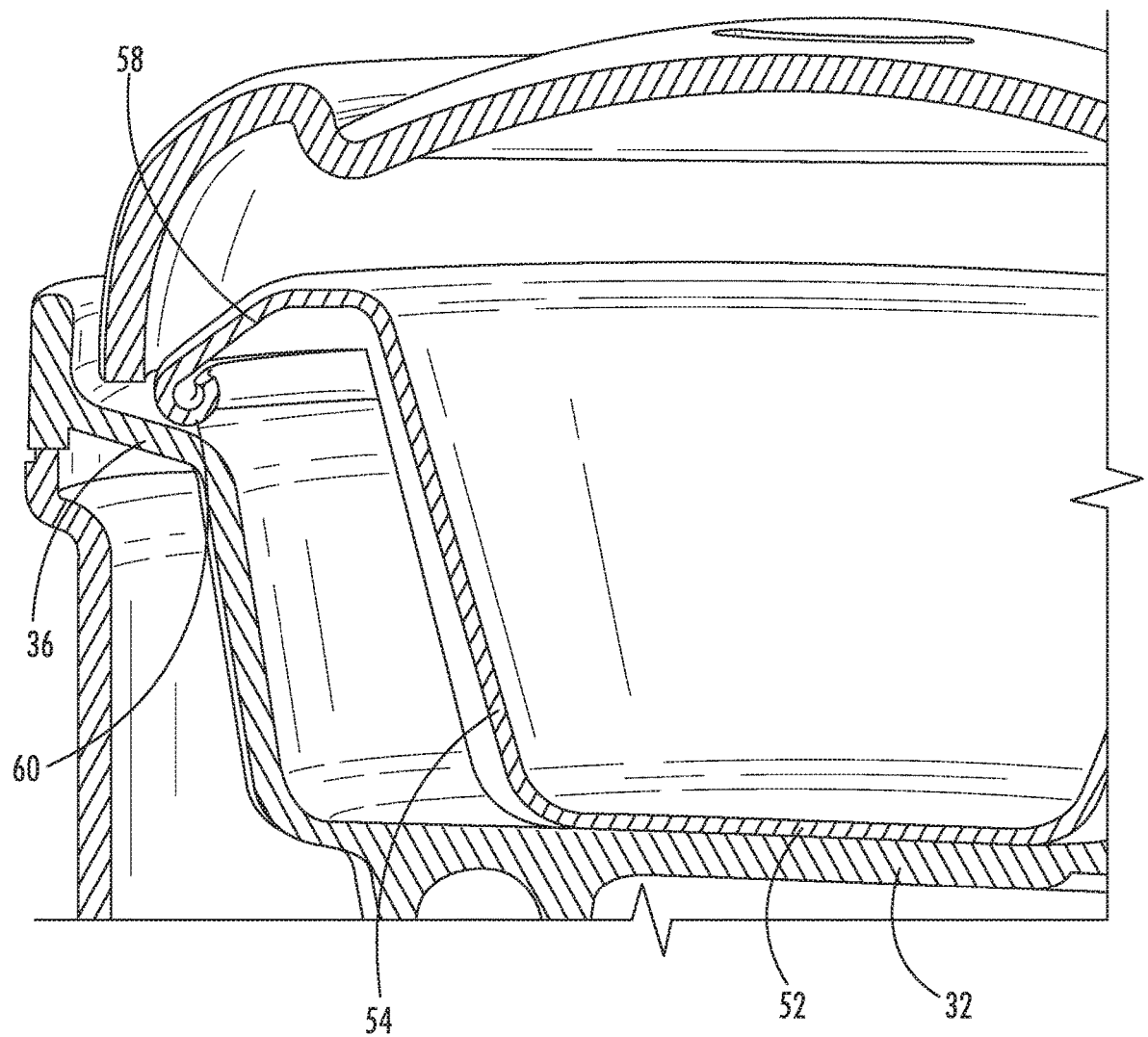
FIG. 7 is an enlarged section view of the cooking appliance as in FIG. 5.

Referring now to FIGS. 4 and 5, the egg cup unit 16 is shown therein. The egg cup unit 16 has a generally oblong perimeter and includes two cups 50, each with a floor 52 and a sloping side wall 54. The cups 50 depend from a generally flat main panel 56. A beveled edge 58 surrounds the main panel 56. At its free end, the beveled edge 58 has an arcuate underturned lip 60 (see FIG. 7). Also, the egg cup unit 16 includes a slot 62 between the cups 50, and further includes a flat handle 64 with a grip 66 that extends from the main panel 56 between the cups 50 (in some embodiments, the handle 64 and grip 66 may be combined as a single component that attaches directly to the egg cup unit 16).

As can be seen in FIG. 5, the egg cup plate 16 resides within the cavity of the heater basin 14. The underturned lip 60 of the egg cup unit 16 rests on the lip 36 of the heater basin 14, thereby providing a barrier therebetween. The cups 50 rest on the upper surface of the floor 32 of the heater basin 14, and are positioned generally within the loops 40a, 40b of the heating element 40.

Referring back to FIG. 1, the lid 18 is generally oblong, with a main portion 68 and a lip 70 extending downwardly from the main portion. A flange 72 extends from one long edge of the lip 70 and includes two bosses 74 at each end. As can be seen in FIG. 1, the bosses 74 receive the hinge posts 28 of the base 12 to form a hinge between the lid 18 and the base 12. The lid 18 also includes a handle 76 that overlies the upper surface of the grip 66 of the egg cup unit 16. The main portion 68 includes two convex domed sections 78 that overlie the cups 50 of the egg cup unit 16. A small slot 80 is present in each of the domed sections 78.

Figure 8:
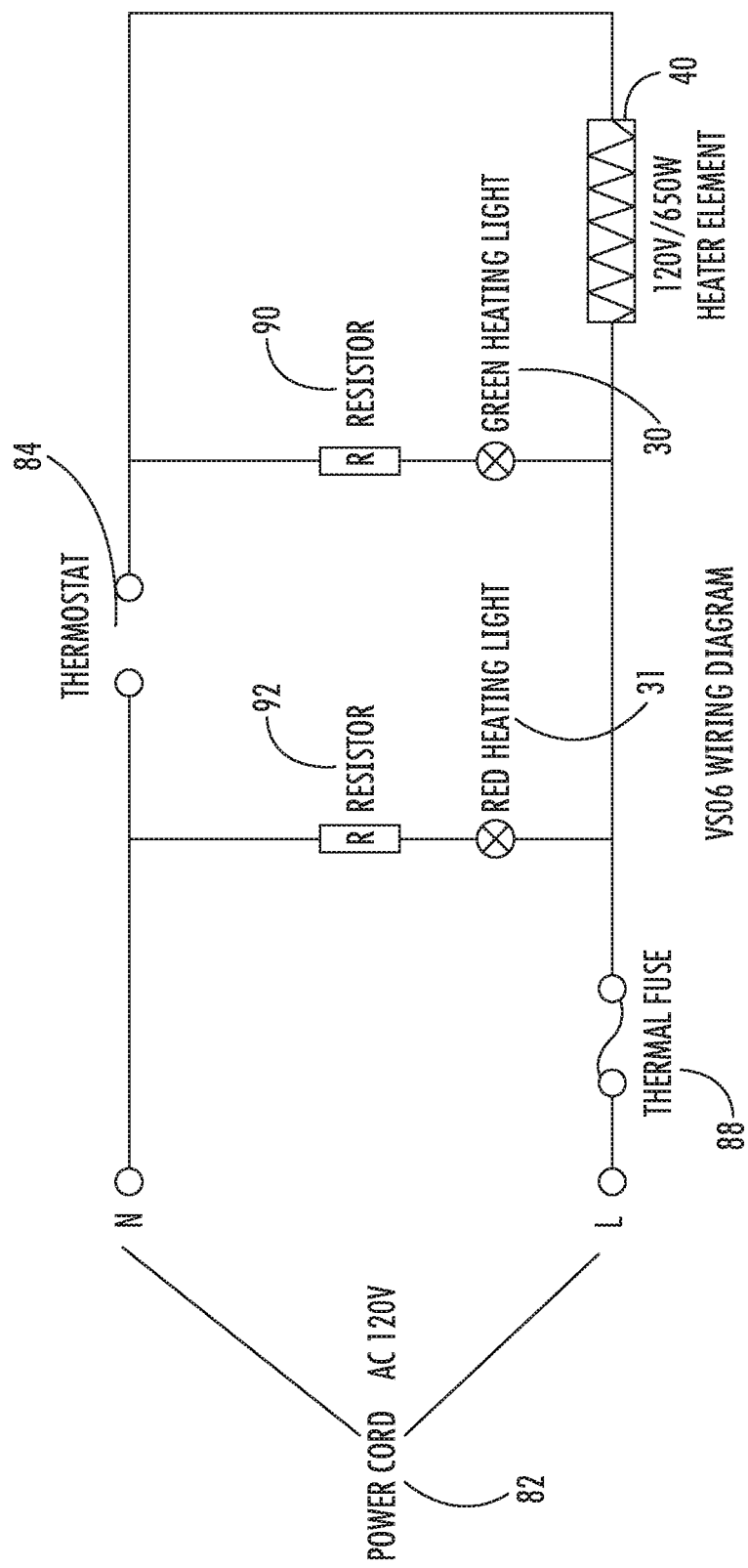
FIG. 8 is a schematic diagram of the electrical system of the cooking appliance of FIG. 1.

Referring now to FIG. 8, a schematic diagram of the electrical system of the appliance 10 is shown therein. The thermostat 84, the heating element 40 and a thermal fuse 88 are connected in series with the power cord 82. The thermostat 84 or other temperature-based switch is configured so that the heating element 40 operates (i.e., generates heat) below a predetermined temperature but is deactivated by the thermostat 84 above the predetermined temperature. In addition, each of the indictor lights 30, 31 is connected in parallel, with the heating light 31 (and accompanying resistor 90) being connected between the thermostat 84 and the heating element 40 and the power light 30 being connected between the power cord 82 and the thermostat 84. As a result, when the thermostat 84 is closed, both of the indicator lights 30, 31 are on, indicating that heating is occurring, and when the thermostat 84 is open (i.e., the predetermined temperature is reached), the heating light 31 is off while the power light 30 remains on.

Operation of the appliance 10 to prepare eggs may follow the steps described below. The heater basin 14 is filled with water to a predetermined level. In some embodiments, the side wall 34 of the heater basin 14 is marked with a line or other indicator to provide a guidance regarding the proper fill level. An uncooked egg is shelled and deposited into each cup 50. Prior to deposit, the egg may be agitated to scramble it, may be unscrambled, and/or may include other liquid or solid ingredients (e.g., milk, cream, cheese, butter, crumbled bacon or sausage, diced onion, etc.); the term "uncooked egg material" is intended to include raw egg alone and mixtures that are predominantly raw egg, but include other ingredients such as the examples listed above. The egg cup unit 16 is then placed within the heater basin 14 and the water held therein. (The uncooked egg material may be introduced into the cups 50 either before or after the egg cup unit 16 is positioned within the heater basin 14). The cups 50 are positioned above the loops 40a, 40b of the heating element 40. The floors 52 of the cups 50 rest directly on the floor 32 of the heater basin 14. The underturned lip 60 of the egg cup unit 16 rests on the lip 36 of the heater basin 14. The lid 18 is then closed over the cups 50.

The power cord is 82 plugged in, thereby enabling energizing the heating element 40 to generate heat. Heat from the heating element 40 impacts the uncooked egg material in the cups 50 in three different ways: (a) heat is transferred directly from the heating element 40 to the floor 32 of the heater basin 14, then from the floor 32 of the heater basin 14 to the floors 52 of the cups 50; (b) the heat from the heating element 40 warms the water in the heating plate 14 in which the cups 50 partially immersed, thereby heating them further; and (c) heat from the heating element 40 also produces steam by gradually boiling the water in the heating plate 14, such that the steam heats the unsubmerged portions of cups 50 and exposed surface are of the egg material. During much of the cooking cycle, the cups 50 are at least partially submerged in water, such that the temperature of the cooking chamber (i.e., the space between the heater basin 14 and the lid 18) hovers around 212° F. The heating element 40 remains energized until the thermostat 84 reaches the predetermined temperature (e.g., 135° C./275° F.), which ordinarily occurs after the water in the heater basin 14 is completely boiled away. At this point the thermostat 84 deactivates the heating element 40, and heating indicator light 31 turns off, thereby signaling to the user that the egg material is cooked.

Notably, the contact between the lips 36, 60 of the heater basin 14 and egg cup unit 16 impedes the flow of steam out of the cavity formed by the heater basin 14 and egg cup unit 16, thereby partially trapping some of the steam. Thus, the egg material is cooked by a combination of direct heat, heated water, and steam. This combination can cook the egg material in a relatively short time period (e.g., 5-10 minutes), without burning, and with the benefit of steaming Typically, the temperature reached by the egg material in the cups 50 should be between about 150 and 175° F. (ordinarily above about 160° F.). Starting from room temperature (e.g., 72° F.), such temperatures are typically reached in 5-10 minutes. The egg material may have the texture and doneness of a hard-boiled egg, a poached egg, or other variety of cooked egg.

In addition, the perimeter edge 58 and the lip 60 of the egg cup unit 16 can help to prevent the splashing of drops of boiling water into the cups 50.

Figure 9A:
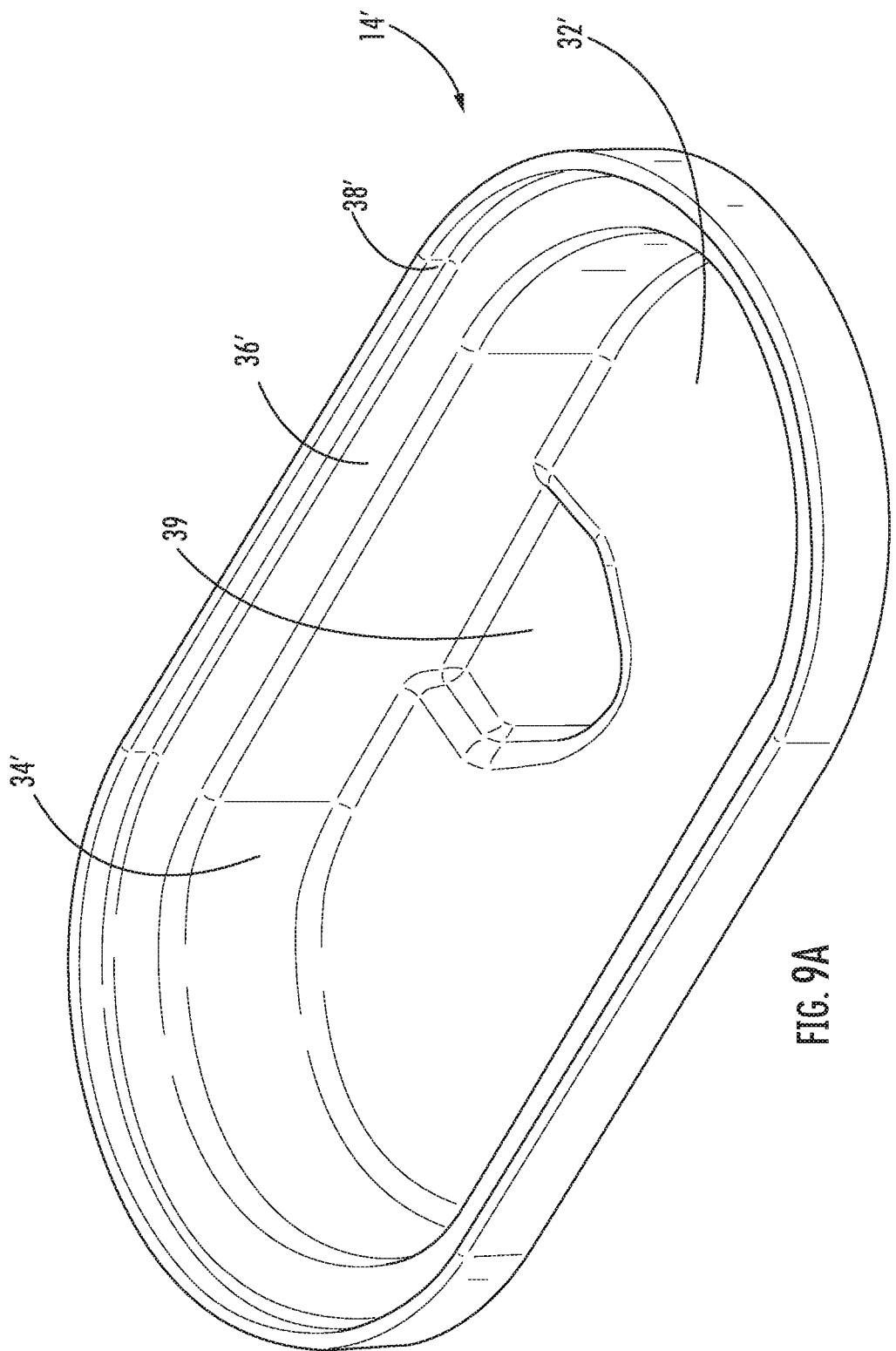
FIG. 9A is a perspective view of a heater basin according to alternative embodiments of the invention.
Figure 9B:
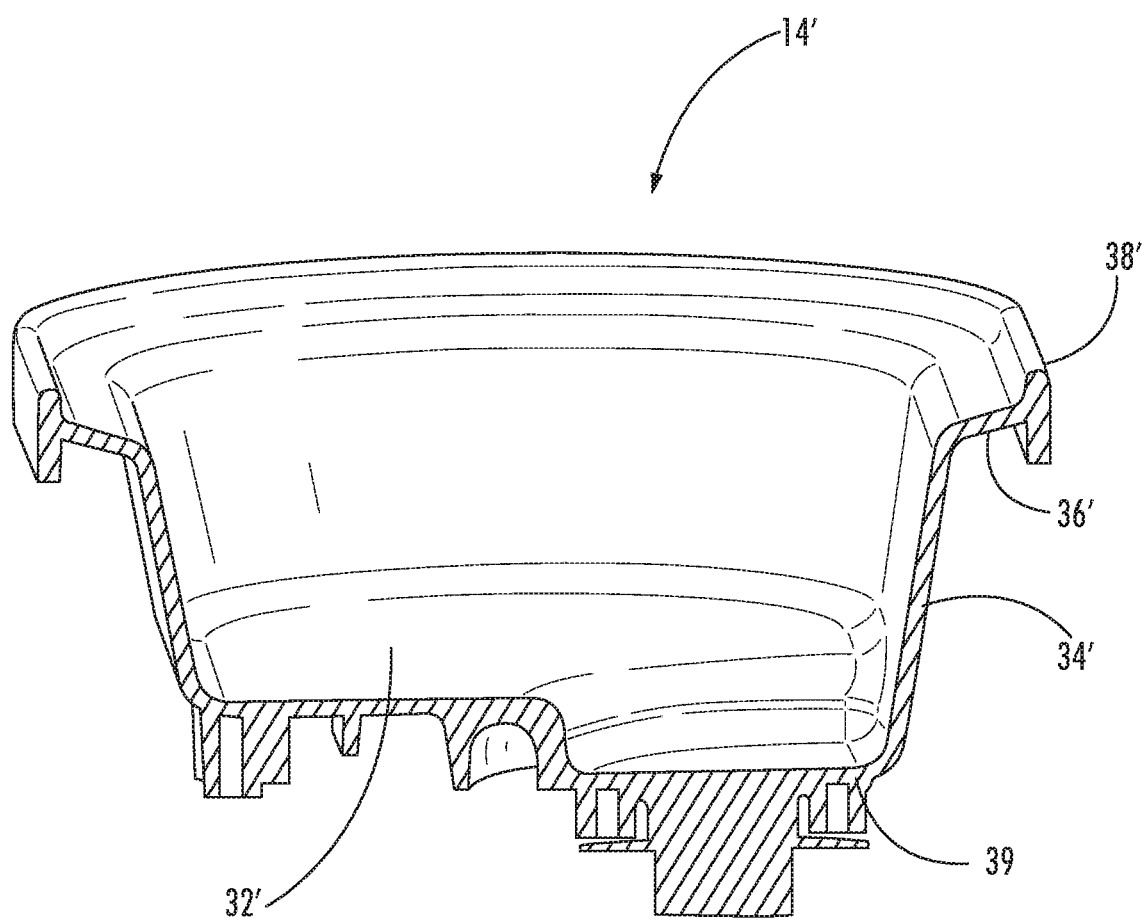
FIG. 9B is an end section view of the heater basin of FIG. 9A.

Those of skill in this art will appreciate that the appliance 10 may take other forms. As an example, an alternative heater basin 14' is shown in FIGS. 9A and 9B. The heater basin 14' has a floor 32', a side wall 34', a perimeter edge 36' and a lip 38' like the heater basin 14. However, the heater basin 14' includes a well 39 located within the central loop of the heating element that depends below the level of the floor 32'. The presence of the well 39 can provide additional volume for water used in the cooking process and/or extend the time and extent of steam generation.

Figure 10A:
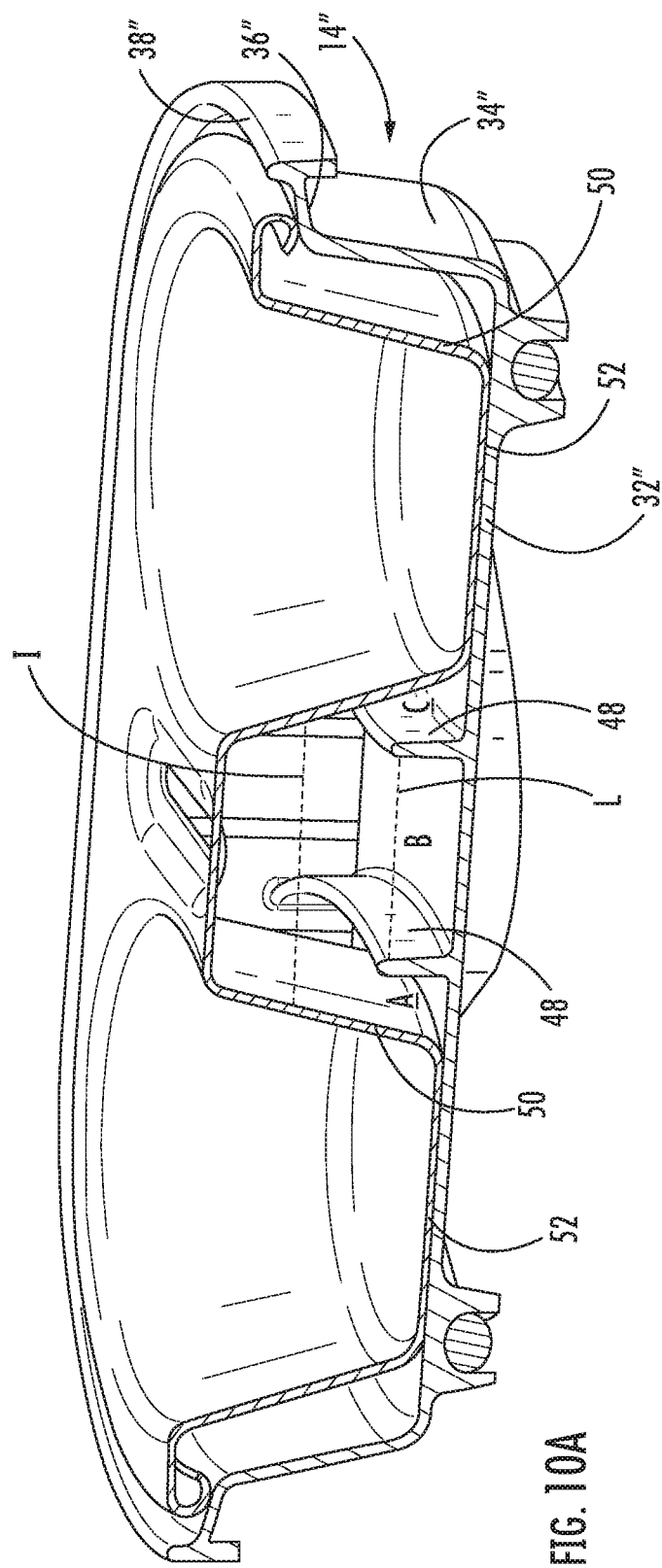
FIG. 10A is a perspective section view of a heater basin and egg cup unit according to alternative embodiments of the invention.
Figure 10B:
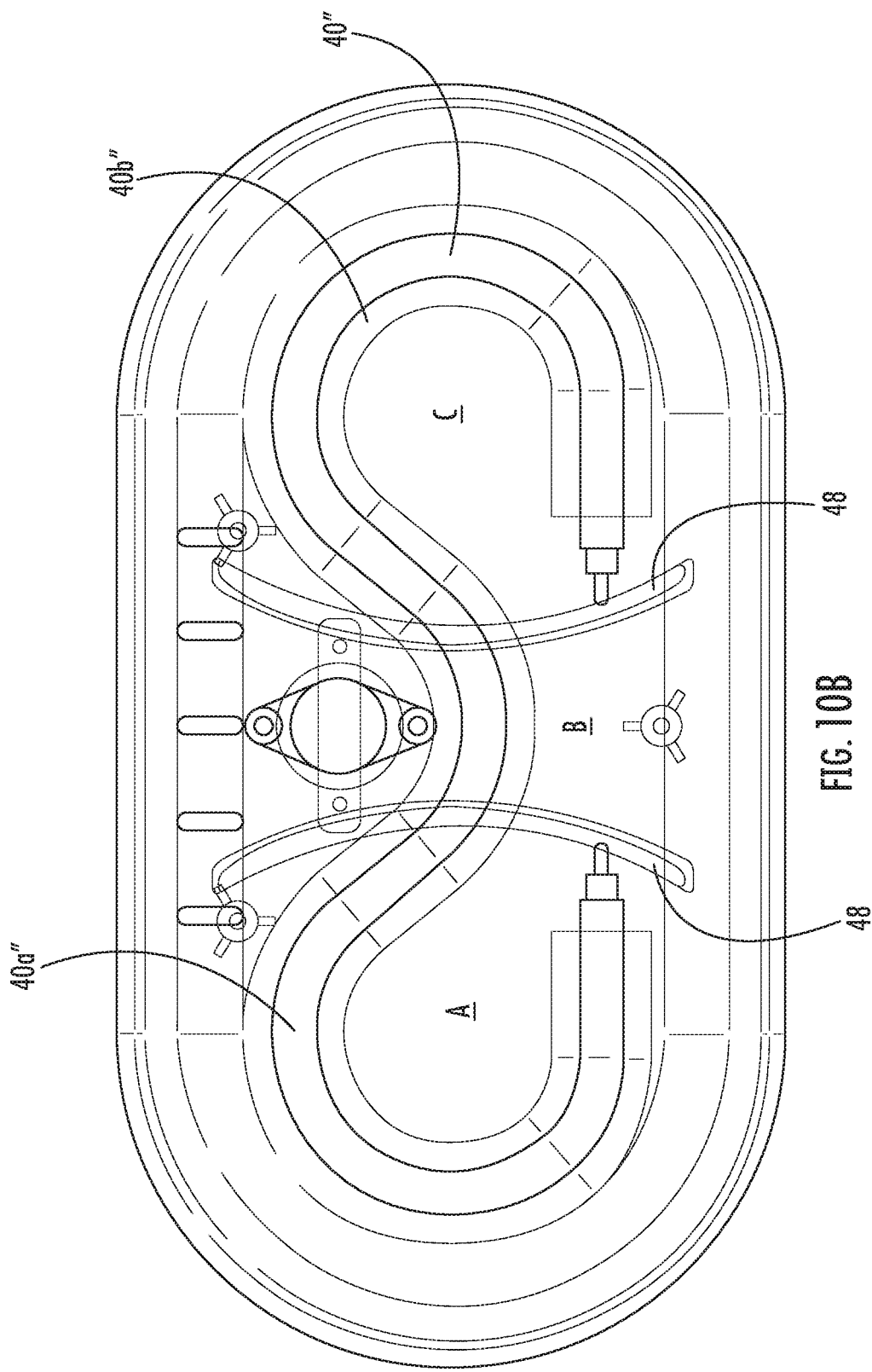
FIG. 10B is a top view of the heater basin of FIG. 10A shown as transparent to illustrate the heater element.

As a further example, another alternative heater basin 14" is shown in FIGS. 10A and 10B. The heater basin 14" has a floor 32", a side wall 34", a perimeter edge 36" and a lip 38" like the heater basins 14, 14'. However, the heater basin 14' includes two arcuate internal dams 48 that extend between portions of the side wall 34 to "section off" the heater basin 14" into three individual sections A, B and C, with sections A and C located below the cups 50 of the egg cup unit 16 and section B located therebetween.

As shown in FIG. 10A, in operation water may be introduced at a level above the upper edges of the internal walls 48, such that the water level I is the same in all three sections A, B, and C. Because the heating element 40" is formed into loops 40a", 40b" below the cups 50, watt density is higher in the sections A, C than in section B, which results in higher temperatures in these sections. As a result, water boils off in the sections A, C faster than in section B. Consequently, once the water in sections A and C has boiled away, water remains in section B at level L. Thus, as conductive cooking of the egg material in the cups 50 occurs via direct contact of the floors 52 of the cups 50 with the floor 32" of the heater basin 14", the water from section B continues to provide steam, which may enhance the cooking process.

Figure 11:
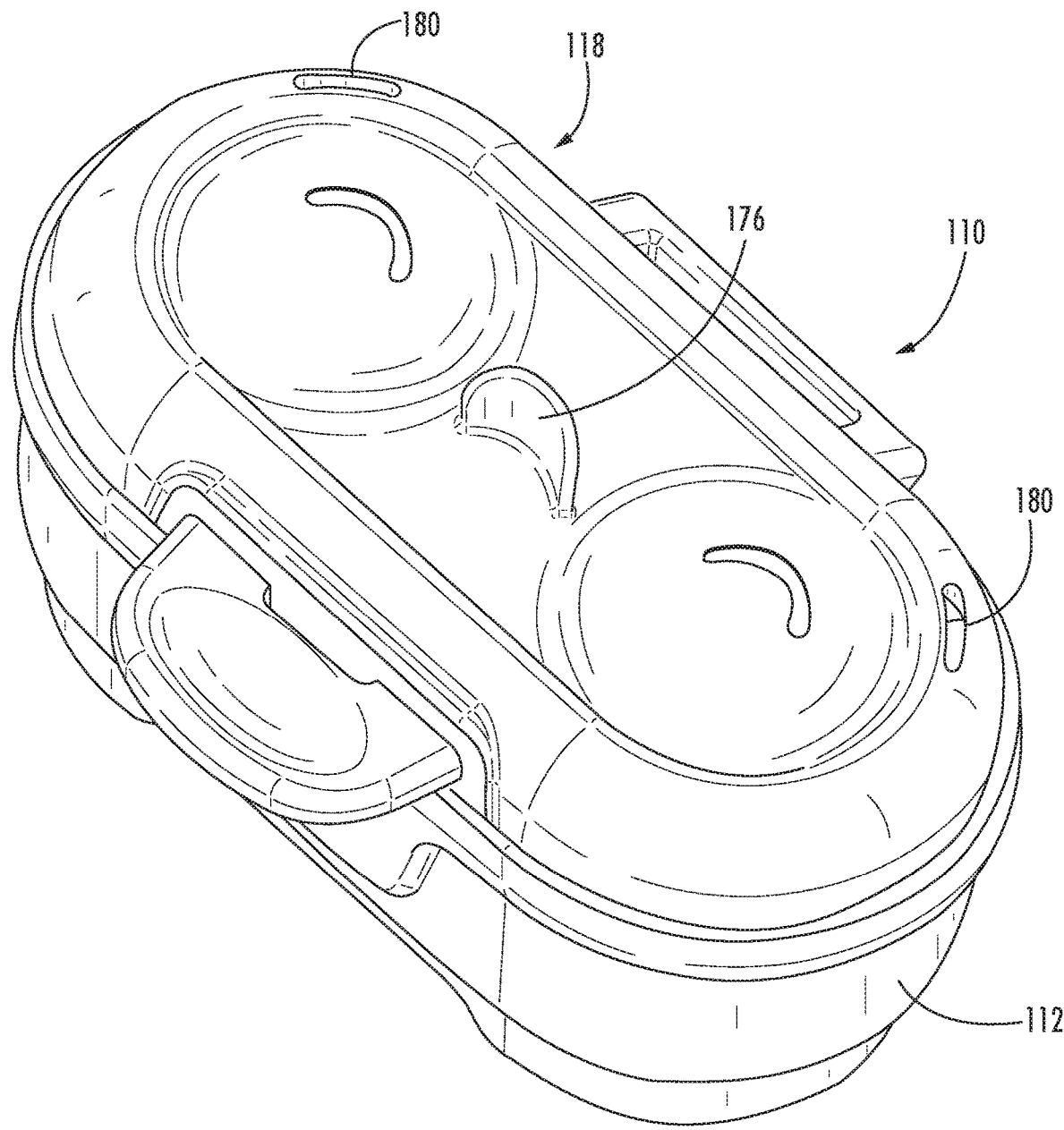
FIG. 11 is a top perspective view of a cooking appliance according to alternative embodiments of the invention.
Figure 12:
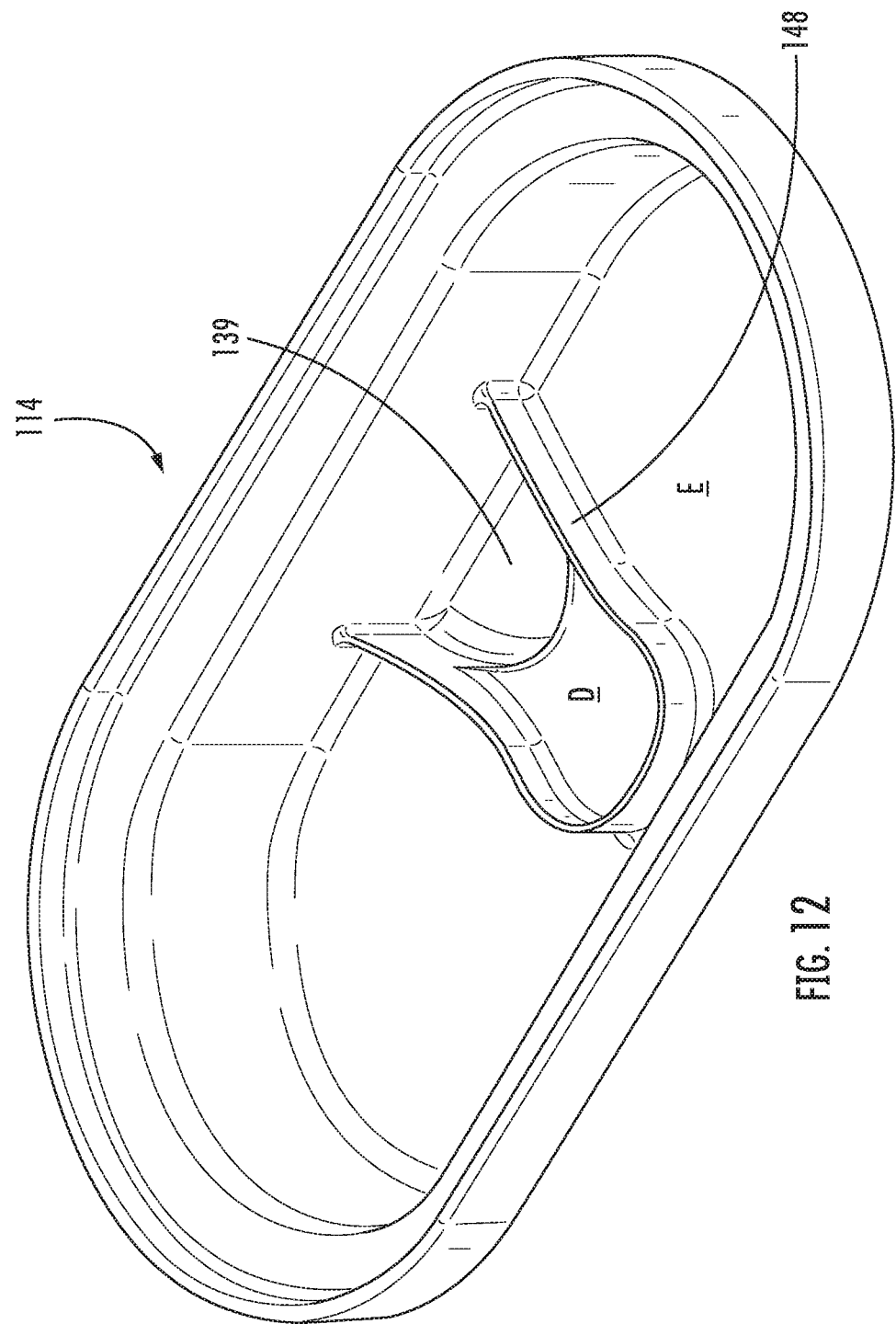
FIG. 12 is a top perspective view of the heater basin of the cooking appliance of FIG. 11.

A further embodiment of an appliance is shown in FIGS. 11 and 12 and designated broadly at 110. The appliance 110 shares many similarities with the prior described embodiments, but includes a detachable lid 118 that can be rested on a flange (not shown) located on the side wall of the base 112 when not covering the egg cup unit. Other differences in the lid 118 include an arcuate handle 176 on the upper surface and slots 180 being positioned near the edges of the lid 118.

The appliance 110 also includes a heater basin 114 (FIG. 12) that combines some aspects of the heater basins 14', 14". More specifically, the heater basin 114 includes a well 139 like that of the heater basin 14', but also includes a single dam 148 that surrounds the well 139 as well as much of the central portion of the heater basin 114. Thus, the heater basin 114 is divided into two sections D and E, wherein section D includes the well 139 and the central portion of the heater basin 114, and section E includes the areas below the egg cups as well as the short path between these areas. The consequence of this configuration is that all of the water in section E will tend to boil off at the same time (which may not be the case with the sections A and C of the heater basin 14"), thereby assuring that the temperature experienced by both egg cups should be very similar.

As another alternative example, although the egg cup unit 16 is shown herein with two egg cups 50, more or fewer egg cups may be included (e.g., 1, 3, 4, etc.). The heating element 40 may be configured differently (for example, it may follow a less serpentine path, or be located directly under the egg cups 50), or multiple heating elements may be employed. The temperature of the heating element may be controllable, via a control lever, dial or the like. The cooking time may also be controlled differently, via a timer or the like, or cooking may be terminated by a different temperature sensing device, such as a temperature sensor.

As another example, the contact between the perimeter of the heater basin 14 and the egg cup unit 16 may vary. For example, in some embodiments the heater basin 14 may include an upturned lip, and the egg cup unit may lack the underturned lip 60, such that the upturned lip of the heater basin contacts the underside of the beveled edge of the egg cup unit. Alternatively, the beveled edge 58 may be omitted (although it may help to shed water away from the egg cups 50). This arrangement would also impede the flow of steam from the heater basin during cooking.

In some embodiments the heater basin 14 is fixed to the base 12, whereas in other embodiments the heater basin 14 may be removable to facilitate cleaning. Also, in some embodiments a cord cover may be attached to the base 12 (typically extending from the rear).

As a further example, the slot 62 in the egg cup unit 16 may be configured so that water for the heater basin 14 may be introduced therethrough.

As still a further example, the lid 18 may be detached (rather than hinged) to the base 12. Such a lid may include a handle incorporated therein.

Moreover, those skilled in this art will recognize that the appliance 10 may be suitable for other foodstuffs.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A cooking appliance, comprising:
a base;
a heater basin mounted above the base and comprising a floor and a side wall that form a cavity configured to hold water, the side wall having a perimeter edge;
a heating element mounted beneath the floor of the heater basin and configured to be connected to a power source, the heater basin including internal dams that separate the heater basin into first, second and third sections;
an egg cup unit comprising a main panel and at least first and second cups depending from the main panel, the first and third sections of the heater basing located beneath the first and second cups, the main panel having a perimeter edge, the at least first and second cups having a floor that contacts the floor of the heater basin; and
a lid mounted on the base and configured to cover the egg cup unit;
wherein the perimeter edge of the egg cup unit rests on but is not fixed to the perimeter edge of the heater basin, the interaction of the perimeter edge of the egg cup unit and the perimeter edge of the heater basin configured to impede flow of steam generated by boiling water in the cavity of the heater basin.

2. The cooking appliance defined in claim 1, wherein the perimeter edge of the egg cup unit includes an arcuate underturned lip that contacts the perimeter edge of the heater basin.

3. The cooking appliance defined in claim 1, wherein contact between the perimeter edge of the heater basin and the perimeter edge of the egg cup unit is substantially continuous.

4. The cooking appliance defined in claim 1, further comprising a temperature sensing device configured to deactivate the heating element above a predetermined temperature.

5. The cooking appliance defined in claim 1, wherein the heater basin further comprises a well that depends downwardly from the floor.

6. A cooking appliance, comprising:
a base;
a heater basin mounted above the base and comprising a floor and a side wall that form a cavity configured to hold water, the side wall having a perimeter edge, the heater basin including an internal dam that separates the heater basin into first and second sections;
a heating element mounted beneath the floor of the heater basin and configured to be connected to a power source;
an egg cup unit comprising a main panel and at least a first cup and a second cup depending from the main panel, the main panel having a perimeter edge, the at least one cup having a floor that contacts the floor of the heater basin, the first section of the heater basin located beneath the first cup and the second cup; and
a lid mounted on the base and configured to cover the egg cup unit;
wherein the perimeter edge of the egg cup unit rests on but is not fixed to the perimeter edge of the heater basin, the interaction of the perimeter edge of the egg cup unit and the perimeter edge of the heater basin configured to impede flow of steam generated by boiling water in the cavity of the heater basin.

7. The cooking appliance defined in claim 6, wherein the perimeter edge of the egg cup unit includes an arcuate underturned lip that contacts the perimeter edge of the heater basin.

8. The cooking appliance defined in claim 6, wherein contact between the perimeter edge of the heater basin and the perimeter edge of the egg cup unit is substantially continuous.

9. The cooking appliance defined in claim 6, further comprising a temperature sensing device configured to deactivate the heating element above a predetermined temperature.

10. The cooking appliance defined in claim 6, wherein the heater basin further comprises a well that depends downwardly from the floor.

* * * * *